March 5, 1957  H. C. PAULSEN  2,783,735
CEMENT HANDLING APPARATUS
Filed Feb. 7, 1955  5 Sheets-Sheet 1

Inventor
Hans C. Paulsen
By his Attorney

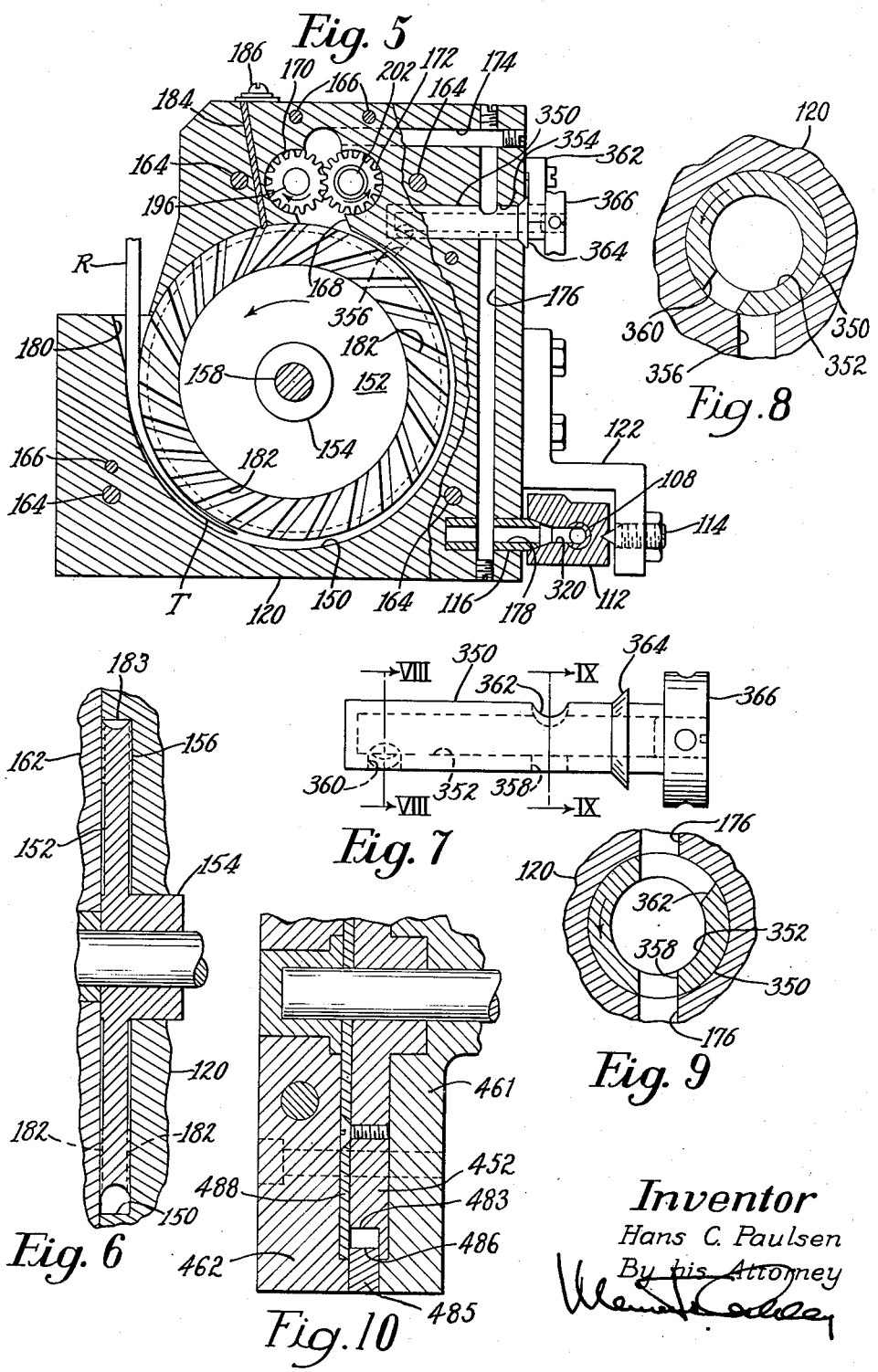

United States Patent Office 2,783,735
Patented Mar. 5, 1957

2,783,735

CEMENT HANDLING APPARATUS

Hans C. Paulsen, Medford, Mass., assignor to United Shoe Machinery Corporation, Flemington, N. J., a corporation of New Jersey Application February 7, 1955, Serial No. 486,475

24 Claims. (Cl. 118—410)

This invention relates to improvements in apparatus for handling and heating thermoplastic cement in rod form prior to its application to a piece of work, and is herein shown as embodied in an apparatus constructed in many respects as disclosed in United States Letters Patent No. 2,765,768, granted October 9, 1956, in the name of the present applicant. It is to be understood, however, that in various novel aspects the invention is not limited to the illustrative embodiment.

For heating and handling thermoplastic cement, the apparatus disclosed in the cited patent employs a heated hollow casing within which there is journaled a rotatable disk. The casing fits against the sides of the disk and is provided with an inlet opening to a passage tangential to the periphery of the disk. A narrow passage extends around a substantial portion of the disk from the inlet opening to an outlet opening. Heat is transferred to a solid rod or strip of cement, not only through the walls of the casing, but also through the periphery of the disk. The rod of thermoplastic cement is melted progressively as it is carried along the passageway in the casing. The rod movement results partly from the frictional engagement of the disk with the sticky rod, and partly from a rod feeding mechanism employing a slip drive. When the passageway is full of cement, a back pressure develops which prevents introduction of fresh rod faster than the melted cement passes through the outlet opening. This feeding arrangement operates in a generally satisfactory manner, but when used with a soft, limber, rubbery rod-type of cement necessary for some applications, the feeding force tends to buckle the rod and fails to feed cement into the heated casing. When the apparatus is stopped during normal operation, the unmelted end of the rod remains in the passageway, and the melted cement tends to expand and overflow back through the inlet opening where it solidifies around the cold rod of cement entering the inlet. When the apparatus is started again, the rod feed mechanism must overcome the increasing resistance of the solidified deposit on the cold rod in forcing the rod through the inlet passage.

An object of the present invention is to provide an improved apparatus of the type of that shown in the aforementioned patent in my name, which will successfully handle a soft, limber and rubbery rod-type of cement and will overcome the disadvantage of overflowing cement. With this object in view, in the herein illustrated apparatus, the cold rod cement is introduced through the inlet opening into contact with the disk by movement in one direction of a novel pusher member, which, near the end of the introductory movement, is moved out of contact with the rod to release the rod for subsequent feeding solely by the rotating disk. To increase the effectiveness of the disk for feeding the rod of cement, the periphery of the disk is arcuately concave increasing the ratio of the moving surface of the disk to the fixed surface of the passageway where the disk drags the cement along to the outlet. Preferably, the arrangement is also such that the rotation of the disk is commenced at the same time that the rod is introduced by the pusher member.

When the delivery of melted cement is no longer called for, the disk is stopped and the rod is partially withdrawn from the passageway in response to movement of the pusher member in the opposite direction. The withdrawal of the rod provides space in which the molten cement remaining in the passageway may expand without overflowing through the inlet opening, and allows the partially melted end of the rod to cool sufficiently to reharden. To facilitate the introduction of the rod into the inlet opening, a guide member is provided, and this guide member is ventilated so that the rod is cooled after it is withdrawn outwardly from the inlet opening to avoid having the rod stick to the guide and to facilitate its reintroduction.

To avoid difficulties caused by the tendency of molten cement to work inwardly along the side faces of the disk, and to become cooked onto the disk and casing surfaces in that area, the opposite side faces of the closely fitted peripheral portion of the disk are provided with grooves. The grooves extend obliquely from the periphery of the disk to a body portion of symmetrically reduced thickness for collecting molten cement which may work along the sides of the disk and for returning the collected cement to the passageway around the periphery of the disk by centrifugal action.

The above and other features of the invention, including novel details of construction and combinations of parts, will now be more particularly described with reference to the accompanying drawings and thereafter pointed out in the claims.

In the drawings,

Fig. 5 is a view in vertical section substantially on line V—V, Fig. 2, and looking in the direction of the arrows;

Fig. 6 is a view in vertical section substantially on line VI—VI, Fig. 1, and looking in the direction of the arrows;

Fig. 7 is a view in side elevation and at an enlarged scale of a by-pass valve associated with the machine;

Fig. 8 is a view in section substantially on line VIII—VIII of Fig. 7 looking in the direction of the arrows;

Fig. 9 is a view in section substantially on line IX—IX of Fig. 7 and looking in the direction of the arrows; and Fig. 10 is a view in section of a modified construction of the mechanism shown in Fig. 6.

Figure 1:
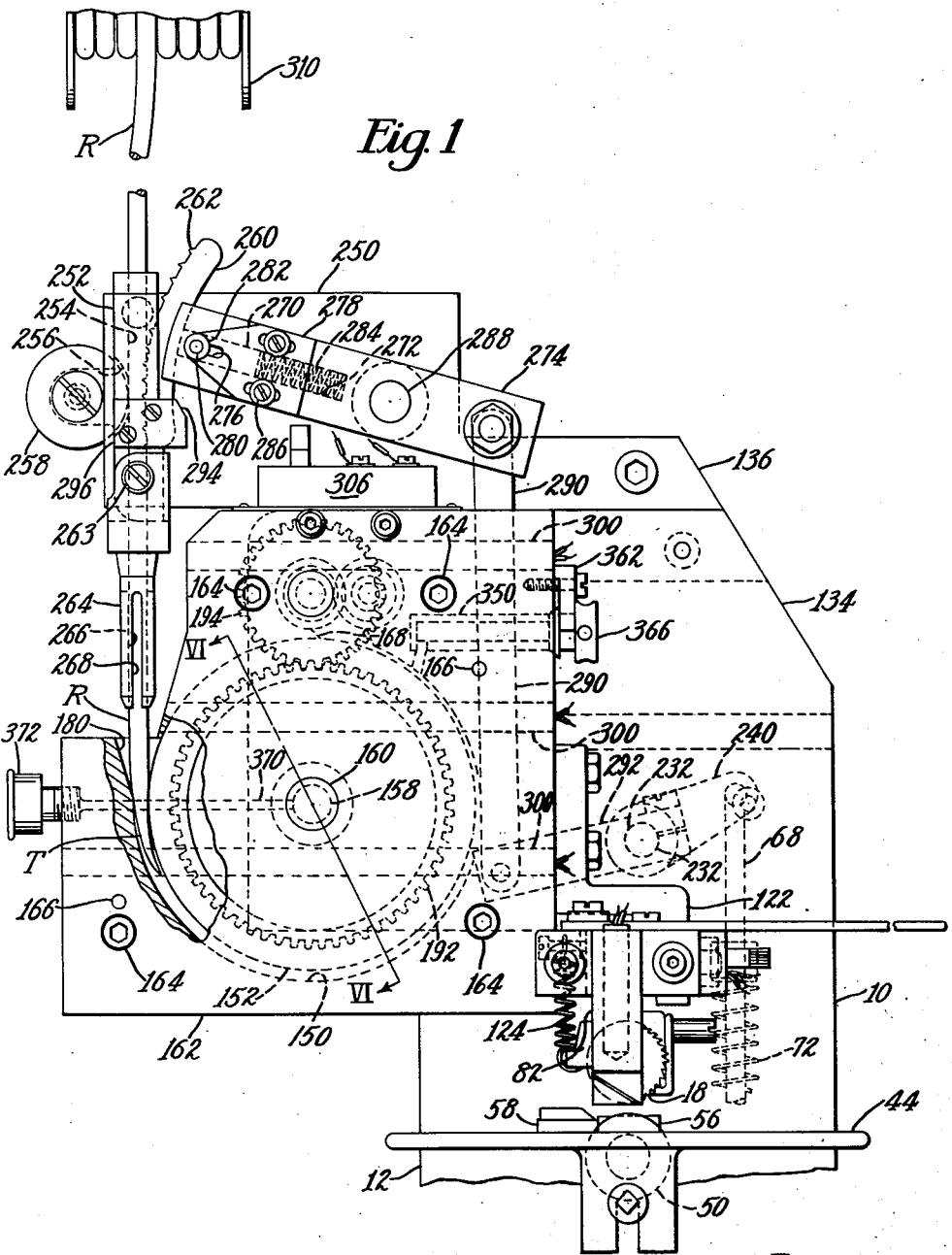
Fig. 1 is a view in front elevation of a machine embodying the features of the invention.
Figure 2:
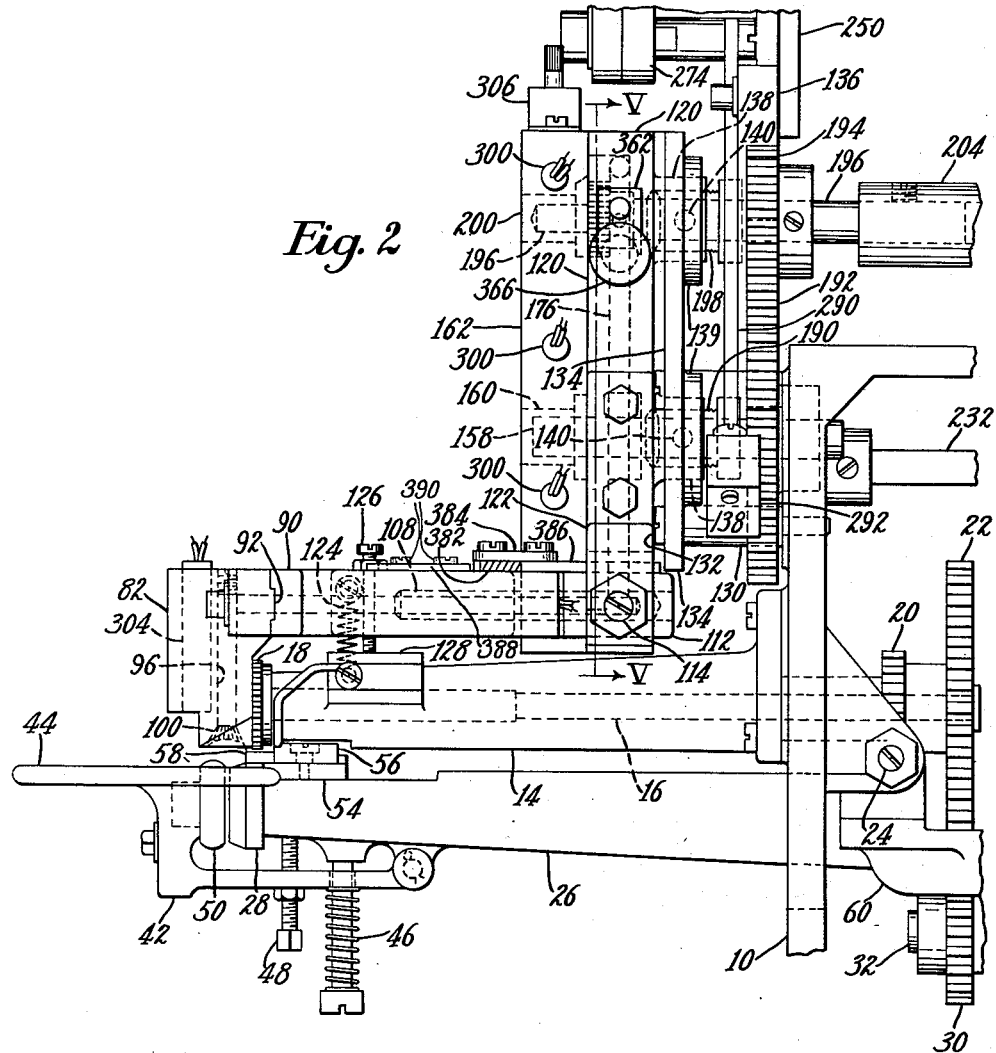
Fig. 2 is a view in side elevation of a portion of the machine shown in Fig. 1.
Figures 4, 4A:
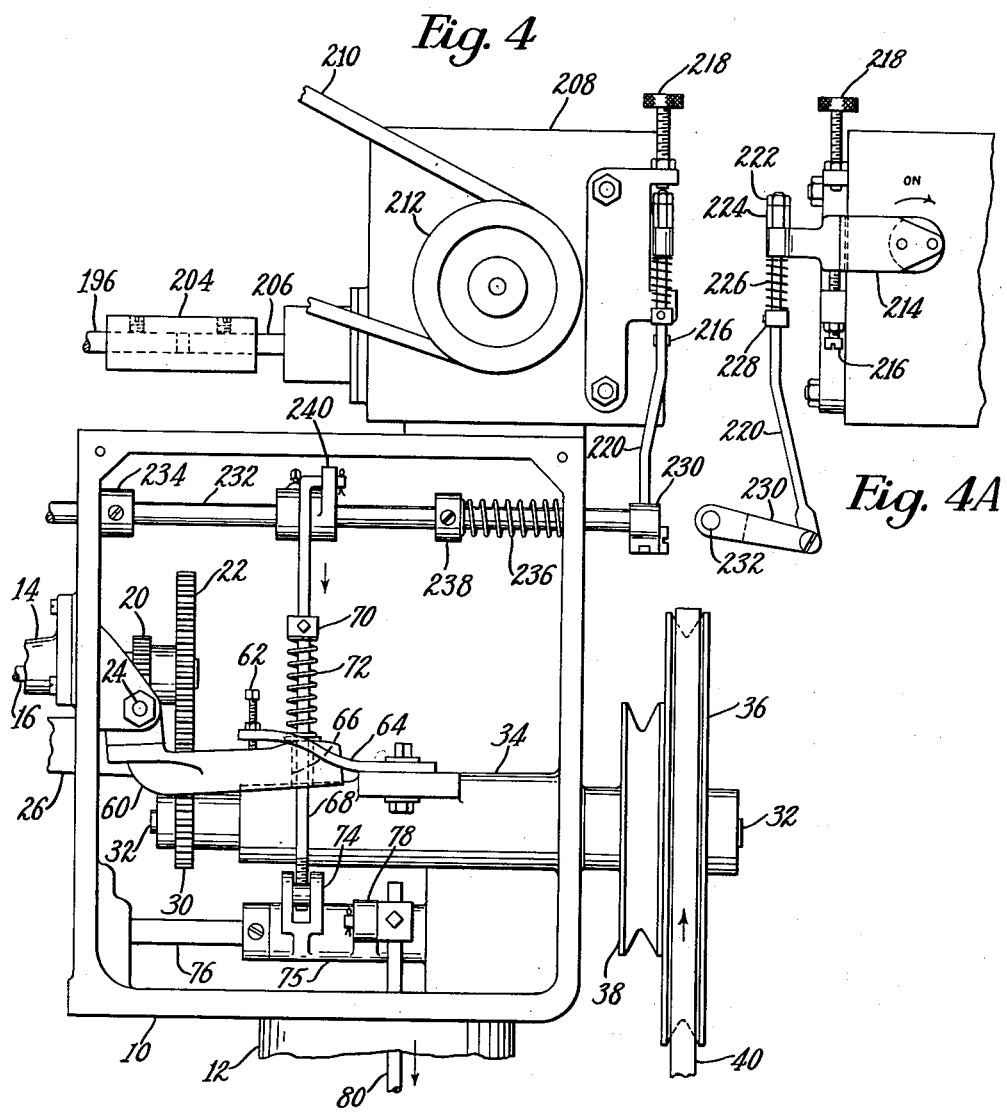
Fig. 4 is a view in side elevation, of another portion of the machine, this view being at a slightly reduced scale as compared to Fig. 2.
Fig. 4A is a view in end elevation of a part of the machine shown in Fig. 4.

Referring to these drawings, and particularly Figs. 1, 2 and 4 thereof, the invention is illustrated as applied to a sole cementing machine of the type disclosed in United States Letters Patent No. 2,073,647, granted March 16, 1937, on an application filed in the name of Carl A. Newhall. This machine comprises a hollow frame casting 10 which is supported on a column 12 of suitable height. Secured to the frame 10 is an elongated bearing member 14 in which there is journaled a shaft 16. This shaft carries at its outer end an upper feed wheel 18 and has secured to its inner end a pinion 20 and a gear 22 (Fig. 2). Pivotally supported on the frame casting, by means of point bearings 24, one of which appears in Figs. 2 and 4, is a second elongated bearing member 26 and journaled in this bearing member is a shaft, not shown, which carries at the outer end a lower feed roll 28. Secured to the inner end of the last-mentioned shaft is a pinion, not shown, which meshes with the previously mentioned pinion 20. The gear 22 meshes with a pinion 30 which is secured to one end of a shaft 32, journaled in a bearing member 34 formed integrally with the frame casting 10, Fig. 4. Secured to the other end of the shaft 32, which extends outside of the casting 10, are a pair of drive pulleys 36, 38 either one of which may be connected to an electric motor, not shown, by means of a belt 40.

Pivotally mounted on the lower side of the bearing member 26 is an arm 42 to which there is secured a work table 44. This work table is yieldingly held, by means of a coil spring 46, in a heightwise position relatively to the member 26 which is determined by an adjustable stop screw 48. Journaled on the table is an idle roll 50, the table being cut away at 52, see Fig. 3, to provide a space through which the roll 50 and the lower feed wheel 28 project. Secured to the outer end of the bearing member 26 is a plate 54, Fig. 2, which carries a pair of edge guide rolls 56, 58. The bearing member 26 has a rearwardly extending portion 60, Fig. 4, which extends beneath a stop screw 62, carried by an arm 64 mounted on the bearing member 34. Extending through a hole 66 in this extending portion 60 is a link 68 to which there is secured a collar 70 and interposed between this collar and the portion 60 is a compression spring 72. The link 68 is connected to one arm 74 of a bell-crank lever 75 which is journaled on a cross shaft 76 and has another arm 78. Connected to the arm 78 is a treadle rod 80 which extends downwardly to a treadle rod, not shown.

As will be readily understood, particularly with reference to the patent mentioned above, with the arrangement which has so far been described, when the treadle is released the table 44, idle roll 50 and lower feed wheel 28 will swing downwardly away from the upper feed roll 18 to facilitate the introduction of a sole member S with its marginal edge against the guide rolls 56, 58. Now, when the treadle is depressed, these parts will be elevated to press the upper surface of the sole member against the upper feed wheel. Thus, with the motor (which is connected to the pulley 36 or 38) operating, the sole member will be fed along automatically, so that a portion of its upper surface adjacent to the edge thereof is passed by a cement applying nozzle, indicated generally by the reference character 82, Fig. 2, for applying a band of adhesive B to the sole.

Figure 3:
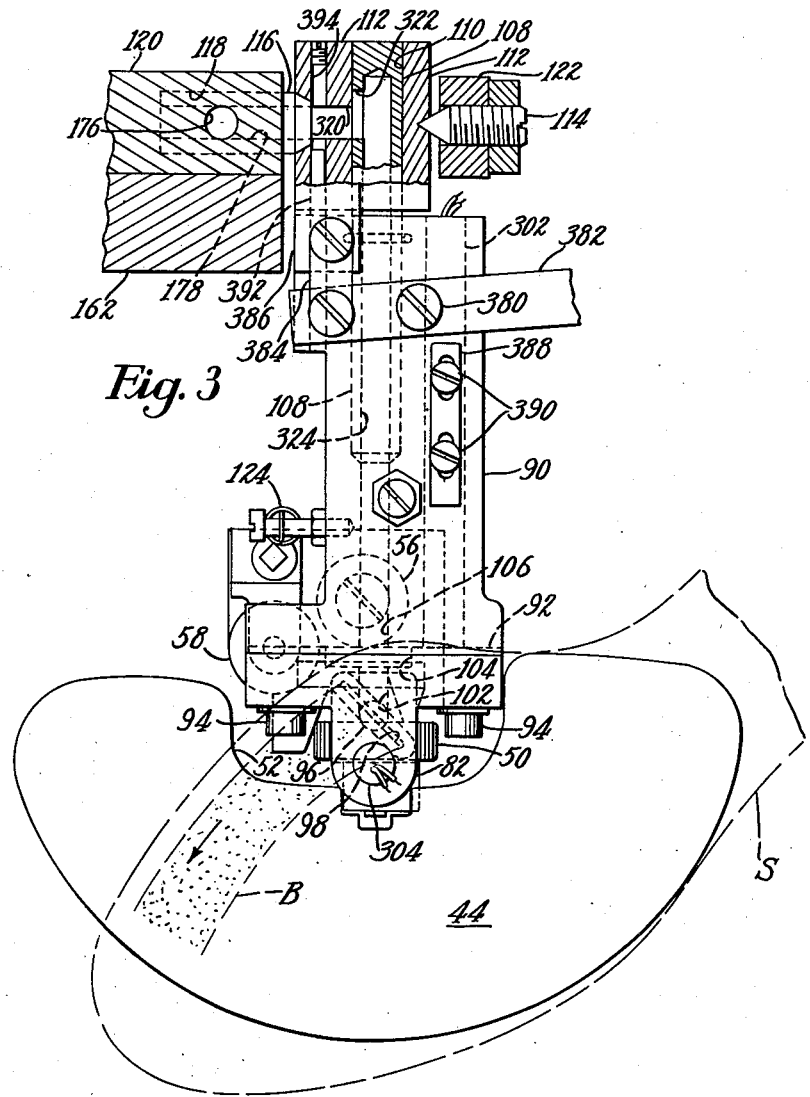
Fig. 3 is a plan view of a part of the machine shown at an enlarged scale.

The nozzle 82 is adjustably secured to the front end of a block 90 by means of a tongue-and-groove connection 92, Fig. 2, and screws 94, 94, Fig. 3, and is provided with a downwardly extending bore 96. At its lower end, the nozzle is beveled off and provided with a discharge orifice 98 which is connected to the bore 96 by means of several small passages 100, Fig. 2. At its upper end, the bore 96 communicates, by means of a passage 102, with an elongated recess 104 which, in all positions of adjustment of the nozzle relatively to the block 90, is in communication with a passage 106 in the block. The block 90 is press-fitted onto one end of a sleeve 108. The other end of this sleeve is slidably mounted in a bore 110 formed in a trunnion member 112 which is journaled on a pivot screw 114 and a conical bearing bushing 116, Fig. 3. The conical bearing bushing is pressed into a bore 118 in a block 120 which forms a part of an adhesive dispensing mechanism, to be described below, while the screw 114 is threaded into a bracket 122 which is secured to the block 120, Fig. 1. A coil spring 124 tends at all times to swing the nozzle 82, block 90 and trunnion member 112 in a counterclockwise direction (Fig. 2) to the extent determined by the engagement of a stop screw 126 with a boss 128 on the bearing member 14 so as to hold the nozzle against the work.

Secured to one side of the frame casting 10, by means of suitable spacer blocks 130 and screws 132 are a supporting plate 134 and an insulating block 136, Fig. 2. The block 120 is mounted on the supporting plate 134 by means of bosses 138, 138 which project through bores formed in the plate 134 and bosses 139 thereon, set-screws 140 being provided for holding the block 120 in adjusted position relatively to the plate 134.

Referring particularly to Fig. 5, the block 120 is provided with a shallow recess 150 in which there is received a disk member 152 having a hub portion 154 and a peripheral portion 156. The hub portion is press-fitted on a shaft 158 which is journaled at one end in the lowermost boss 138 of the block 120. The other end of this shaft is journaled in a bearing bushing 160 which is mounted in a closure member 162. This closure member is secured to the block 120 by means of screws 164 and dowel pins 166, Fig. 1. The recess 150 has an upwardly extending outlet opening 168 which is shaped to receive the two gears 170, 172 of a gear pump which feeds molten cement from the outlet opening through two passageways 174, 176, the latter of which is in communication with a bore 178 in the bearing bushing 116, Fig. 5. The recess 150 also has a flared portion which provides an inlet opening 180 into the space between the periphery of the disk 152 and the outer wall of the recess. As will be apparent in Fig. 5, this outer wall of the recess, from the flared entrance portion 180 around to the outlet opening 168 is eccentrically disposed with respect to the axis of the shaft 158 so that an annular space or passage of decreasing radial depth is provided. Continuing around the disk from the outlet opening 168, the outer wall of the recess is concentric with the shaft 158 and is of substantially the same radius as the disk 152. The depth of the recess 150 is substantially the same as the thickness of the peripheral portion 156 of the disk 152, which peripheral portion is somewhat thicker than the body portion of the disk and on the opposite sides of this peripheral portion of the disk obliquely disposed grooves 182 are provided. In cross section, the peripheral edge of the disk has a curved groove, as shown at 183 in Fig. 6. Fitted into a radial groove in the block 120 and held in place by a screw 186 is a scraper blade 184 the lower end of which is shaped to fit in the groove 183. The grooved periphery on the disk provides a more effective carrying surface for dragging along the sticky rod R of cement against the resistance offered by the fixed surfaces of the passageway formed around the periphery of the disk by the recess 150 and the closure member 162. As a result of this arrangement the ratio between the moving surface area of the disk which engages the rod and the fixed surface area of the passageway approaches unity. It will be understood that the function of the scraper blade 184 is to remove any portion of the cement which sticks to the bottom of the groove and is not scraped off by the adjacent surface of the recess in the block 120.

A still further increase in the ability of the moving disk to carry along sticky cement against the resistance offered by the fixed surfaces which form the annular space or passage is provided by the modified construction shown in Fig. 10. In that construction a disk 452 has a square-bottomed peripheral groove 483 which is deep enough to receive the whole body of a cement rod R so that the latter is surrounded on three sides by the moving disk. The annular passage around the periphery of the disk is closed except at the inlet and the outlet by the inner periphery of a circular opening in a flat plate 485 which has the same thickness as the groove in the disk and which is secured between a modified casing block 461 and a closure plate 462. The inner periphery 486 of the opening in this plate 485 is circular but is eccentric with respect to the periphery of the disk 452 and is cut away to provide an outlet opening like that at 168 (Fig. 5) and an inlet opening like that at 180. For ease in assembling, one face of the disk is formed as a removable plate 488 which is attached to the body of the disk 452 and which fits within a recess in the closure plate 462. When the apparatus is constructed in this way the ratio of the moving cement contacting surface of the disk to the fixed surface 486 of the plate 485 is greater than unity at all points along the annular passage which carries the cement.

The shaft 158 extends through a packing gland 190, associated with the lower boss 138, and has secured to its outer end a gear 192. This gear meshes with a pinion 194 which is fast on a shaft 196, Fig. 2. One end of this shaft extends through a packing gland 198, associated with the upper boss 138, and is connected to the gear 170 of the gear pump. This end of the shaft extends through the gear 170 and is journaled in a bearing bushing 200, carried by the closure block 162. The other gear 172 of the gear pump is mounted on a stub shaft 202 which is supported in the block 120 and in the closure block 162. At its opposite end, the shaft 196 is connected by means of a coupling 204 to the output shaft 206 of a hydraulic speed gear indicated generally by the reference character 208 which is supported on the frame casting 10, Fig. 4.

The hydraulic gear 208 is of a conventional construction available on the open market and since it forms no part of the present invention need not be described in detail. However, it is explained that this hydraulic gear includes a pump which is constantly driven by a motor, not shown, through a belt 210 and a pulley 212. This pump, which is of the variable delivery type, is directly connected to a hydraulic motor which drives the output shaft 206, the arrangement being such that when a control arm 214 is in the position shown in Figs. 4 and 4a, and as determined by a lower stop screw 216, the pump is set for zero delivery so that the shaft 206 is stationary. However, when this control arm is swung in a clockwise direction, Fig. 4a, to a position determined by an upper stop screw 218, the pump delivers operating fluid to the motor for driving the shaft 206 (and hence the shaft 196) in the direction indicated by the arrow, Fig. 5, and at a speed determined by the setting of the stop screw 218. The arm 214 is connected to the upper end of a link 220, by means including a nut 222, spacer 224, spring 226 and collar 228, Fig. 4a, while the lower end of this link is connected to an arm 230 which is carried by a shaft 232. This shaft is journaled in the frame casting 10 and is held against axial movement, relatively to this casting, by means of a collar 234, coil spring 236 and collar 238. Also carried by this shaft is a second arm 240 which is connected to the upper end of the link 68, previously referred to. Thus, when the treadle, not shown, is depressed, the disk 152 and gears 170, 172 of the gear pump will be rotated in the directions indicated by the arrows thereon in Fig. 5.

Secured to the upper portion of the insulating member 136 is a supporting plate 250 on which there is mounted a guide block 252 provided with a bore 254. Projecting into this bore, through a slot 256 on one side of the block 252, is an anti-friction roller 258 which is journaled on the block and adapted to support laterally a strip of adhesive in rod form R threaded through the bore 254. The opposite side of the block 252 is also slotted to receive an arcuate pusher member 260 which is provided with teeth 262 for frictionally engaging the rod of adhesive. Pivotally mounted by means including a stud 263, on the lower end of the block 252 is a guide bushing 264 having a bore 266 which is in axial alinement with the bore 254 when the guide bushing is in the angular position shown in Fig. 1. When the apparatus is not in use, the guide bushing 264 is turned to horizontal to avoid hot air rising from the casing. At its lower end, this guide bushing has four diametrically disposed slots 268 to allow circulating air to cool the rod as will presently appear.

The pusher member 260 has a radially extending plunger 270 which is received within a bore 272 formed in one arm of a lever 274, and projecting outwardly from this plunger through a slot 276 in the plate 278 is a pin 280 on which there is mounted a cam roll 282. A coil spring 284 in the bore 272 constantly urges the pusher member 260 toward the left, Fig. 1, to the extent permitted by the engagement of the pin 282 with one end of the slot 276. The plate 278 is adjustably secured to the lever 274 by screws 286 for varying the extent of movement of the pusher member 260 by the spring 284. This lever is pivotally mounted on a stud 288 which projects forwardly from the plate 250 and connected to the other arm of this lever is an upper end of a link 290. The lower end of this link is connected to an arm 292 which is fast on the shaft 232. Hence, when the treadle, not shown, is depressed, the lever 274 will be swung in a counterclockwise direction, Fig. 1, thereby causing the pusher 260 to drag the rod of adhesive R downwardly through the bores 254, 266 in the block 252 and through the guide bushing 264 which directs the end of the rod into the flared inlet opening 180. As the lever is swung in this direction, the cam roll 282 eventually rides up along an inclined cam surface 294, formed on a cam plate 296 which is secured to the block 252, thereby causing the pusher member to be withdrawn from engagement with the rod of adhesive and releasing this rod to the action of the disk 152 which will continue to carry the rod along by friction so long as it engages a substantially solid portion thereof.

The block 120, closure member 162 and disk 152 are heated by means of electrical heating units 300, 300, 300 which are inserted in bores formed in the closure member, Fig. 1, while the block 90 and nozzle 82 are provided, respectively, with similar electrical heating elements 302, 304. These several heating units are connected to a suitable source of electrical energy, not shown, and preferably are controlled by thermostats, one of which is shown in Fig. 1 and indicated by the reference character 306.

When the leading end of the rod R of adhesive, which is herein illustrated as stored in a coil on a reel 310, is introduced into the entrance 180 of the space between the disk 152 and the outer wall of the recess 150 and into contact with the periphery of the disk, the latter will as it rotates draw the leading end of the rod of adhesive along with it. As the leading end of the rod of adhesive is thus drawn along by the disk, it will be gradually reduced to a molten state by the heat transferred to the adhesive from the side and outer walls of the recess 150 and from the peripheral surface of the disk. This molten adhesive will be urged along through the space between the periphery of the disk and the outer wall of the recess by the action of the rotating disk as well as by the action of the entering solid portion of the rod which will assume a gradually tapering tail portion as identified at T in Fig. 5. As this molten adhesive is delivered by the rotating disk into the outlet opening 168 of the recess 150, it is picked up by the gears 170, 172 of the gear pump and forced through the passageways 174, 176 in the block 120, and the passageway 178 in the bushing 116. From the latter passageway, the molten adhesive is forced through a passageway 320 in the trunnion block 112 which is always in communication, through an elongated slot 322, with a bore 324 in the sleeve 108. This bore is connected to the passageway 106 in the block 90 which communicates with the nozzle 82 through the recess 104, passage 102 and bore 96. Thus, so long as the treadle, not shown, is depressed, molten adhesive will be discharged through the orifice 98 of the nozzle and applied to the sole member S as the latter is fed past the nozzle by the action of the feed wheels 18, 28.

When the treadle is released, the disk 152 and gears 170, 172 of the gear pump will immediately come to a stop, thereby discontinuing the flow of molten adhesive from the nozzle 82. Also, as the pusher member 260 is returned to the position in which it is shown in Fig. 1, the leading end of the rod of adhesive will be retracted so that the tail portion T will assume a position substantially like that shown in Fig. 1, thereby providing space into which the molten adhesive remaining between the periphery of the disk 152 and the outer wall of the recess 150 may expand without backing up through the entrance opening 180. The leading end of the adhesive which is thus withdrawn into the guide bushing 264 will be cooled and rehardened by the exposure to the air through the slots 268. The next time the machine is put in operation by the depression of the treadle, the leading end of the rod of adhesive will again be projected to the position in which it is shown in Fig. 5 so as to be picked up by the rotating disk 152 in the manner previously explained.

For regulating the flow of adhesive from the nozzle 82, a by-pass valve is provided. This valve comprises a body portion 350 having a central bore 352 which is closed at both of its ends, Fig. 7. The body portion of the valve is rotatably mounted in a bore 354 formed in the block 120 so as to traverse the passageway 176 and also to open into a passageway 356 connected to the recess 150 adjacent to the upwardly extending portion 168 thereof, Fig. 5. Extending from the central bore 352 outwardly through the body portion of the valve are two circular ports 358, 360 and a circumferentially elongated port 362, Figs. 8 and 9. The valve member is held in place by means of a keeper block 362 which fits in the annular space between a conical flange 364 and a head 366 of the valve member. When this valve member is in the position shown in Figs. 5, 8 and 9, communication between the central bore 352 and the passageway 356 is shut off so that all of the molten adhesive delivered by the gear pump 170, 172 is extruded out through the nozzle 82. However, by rotating the valve in a counterclockwise direction, see arrow (Figs. 8 and 9), the amount of adhesive which flows through the port 358 and into the lower portion of the passageway 176 may be gradually reduced while the remaining portion of the adhesive which is delivered by the pump is by-passed through the port 360 and the passageway 356 back to the space between the disk 152 and the outer wall of the recess 150 and thence back to the gear pump. In this manner, the rate of discharge of the molten adhesive from the nozzle 82 may be nicely regulated from an amount equal to the maximum delivery rate of the gear pump down to a zero discharge. Inasmuch as the solid portion of the rod R can only be drawn into the space between the periphery of the disk and the outer wall of the recess 150 at the same rate as molten adhesive is taken away from this space, the rate at which the rod R is moved along by the disk will vary in proportion to the rate at which the molten adhesive is discharged through the nozzle 82.

As stated above, the peripheral portion 156 of the disk 152 is of substantially the same thickness as the depth of the recess 150. During the rotation of the disk, any molten adhesive which may work inwardly between the sides of the peripheral portion 156 and the side walls of the recess 150 and of the closure block 162 will be collected by the obliquely disposed grooves 182 and returned through these grooves to the space between the periphery of the disk and the outer wall of the recess by centrifugal action. Similarly any molten adhesive which might work down along the opposite sides of the disk when the machine is idle and the disk stationary, will be returned to the space between the disk and the outer wall of the recess in the same manner. This arrangement tends to avoid difficulties which might otherwise arise because of adhesive becoming cooked onto the opposite sides of the disk or onto the side walls of the recess and/or the inner surface of the closure block. Suitable lubrication for the shaft 158 is provided by means of a duct 370 and grease cup 372, Fig. 1.

Inasmuch as the sleeve 108 is slidably mounted on the trunnion block 112, it is possible to shift the nozzle 82 in a direction extending generally transversely of the sole S and thereby to vary the exact position of the band of adhesive B relatively to the marginal edge of the sole and thus to avoid squeeze-out at the shank portion thereof. To facilitate such shifting of the nozzle during the operation of the machine, the following arrangement is provided. Pivotally mounted on the block 90, by means of a pivot screw 380, is a hand lever 382, Fig. 3, one end of which is connected, by means of a link 384, to a plate 386, secured to the trunnion member 112, see Fig. 2. Thus, by swinging this hand lever, the operator may shift the nozzle 82 between limits determined in one direction by a stop plate 388, adjustably secured to the block 90 by screws 390, and in the other direction by a stop pin 392 which is press-fitted in a bore 394 in the trunnion block 112 and which projects slightly beyond this block and toward the block 90. It will be observed that, due to the provision of the elongated slot in the movable sleeve 108, the aforementioned shifting of the nozzle will have no adverse effect on the continuity of the rate of discharge of the molten adhesive therefrom.

The manner of operation of the construction provided by the present invention will now be briefly summarized.

Assuming that a cement rod has been threaded through the guide block 252 and into the inlet passage 180 to a position such as in Fig. 1, and that the heating units in the cement handling mechanism have been turned on, the operator starts the feed rolls 18 and 28 and the hydraulic gear 208 to prepare the machine for operation. A sole member is placed with its lower surface on the work table 44 and with its marginal edge against the guide rolls 56, 58. The treadle is depressed, elevating the lower feed roll 28 and the idle roll 50 to press the upper surface of the sole member against the upper feed roll 18. The sole will be fed along automatically so that the portion of its upper surface adjacent to the edge thereof will be passed under the cement applying nozzle 82. Depression of the treadle also sets the disk 152 and the gear pump 170, 172 in motion and causes the pusher member 260 to introduce the rod of cement into contact with the disk, as shown in Fig. 5. As the disk rotates it carries the solid rod along and the adhesive is melted and delivered to the gear pump 170, 172 through the outlet opening 168. Melted cement is dispensed by the gear pump through the nozzle 82 to apply a band of adhesive on the surface of the sole member as the feed rolls automatically feed the work past the nozzle.

To vary the position of the band of adhesive relatively to the marginal edge of the sole, the operator may shift the nozzle transversely of the sole by swinging the hand lever 382, while the amount of adhesive deposited on the surface of the sole may be varied, from zero discharge to the full delivery rate of the gear pump, by adjustment of the position of the by-pass valve 350.

When the band of cement has been applied completely around the margin of the sole or around that portion thereof that is desired to be coated, the operator releases the treadle. The lower feed roll and the work table swing downwardly to stop the work feed and the disk and gear pump stop rotation to terminate dispensing of cement from the nozzle. At the same time, the rod of cement is withdrawn from contact with the disk and to the position shown in Fig. 1 by the pusher member 260.

It will be understood that when a sole member is coated with cement in the above manner it may be applied immediately to a shoe bottom before the cement loses its adhesive qualities or may be applied at a later time in which case the adhesive must be reactivated.

Having thus described my invention, what I claim as new and desire to secure by Letters Patent of the United States is:

1. In apparatus for handling a limber rod of thermoplastic adhesive, a heated hollow casing wherein the adhesive is melted progressively, said casing being provided with inlet and outlet openings, a member movable within the casing effective for feeding the rod from one opening to the other when the rod is in contact therewith, means for driving said movable member, an oscillatory member engaging said rod and intermittently operative to thrust it into the inlet opening into contact with the movable member, and means for guiding the molten adhesive from the outlet opening to a piece of work.

2. In a handling apparatus for adhesive in rod form, said apparatus having a heated hollow casing provided with inlet and outlet openings, means movable within the casing for carrying thermoplastic adhesive from one opening to the other, and means for operating said carrying means, an oscillatory member for introducing a rod of adhesive through the inlet opening into contact with said carrying means, means for moving said member, and mechanism controlled by said introducing means for causing said operating means to operate said carrying means as the rod is introduced.

3. In a handling apparatus for adhesive in rod form, said apparatus having a heated hollow casing provided with inlet and outlet openings, means movable within the casing effective for carrying thermoplastic adhesive from one opening to the other when a rod of adhesive is in engagement therewith, a member movable back and forth for withdrawing an unmelted portion of a rod outwardly through said inlet opening away from engagement with said carrying means thereby rendering said moving means ineffective, and means for moving said member.

4. In a handling apparatus for adhesive in rod form, said apparatus having a heated hollow casing provided with inlet and outlet openings, means movable within the casing for carrying thermoplastic adhesive from one opening to the other, a member movable back and forth for withdrawing an unmelted portion of a rod outwardly through said inlet opening away from said carrying means, a ventilated guide for the rod of adhesive as it is thrust into the inlet opening, means for supporting the guide in a position separated from the heated casing, and means for moving said member to withdraw the unmelted rod into said guide whereby it may harden before it is again thrust into the casing.

5. In a handling apparatus for adhesive in rod form, said apparatus having a heated hollow casing provided with inlet and outlet openings, means movable within the casing effective for feeding a rod of thermoplastic adhesive from one opening to the other when the rod is in engagement therewith, and means for operating said feeding means, an oscillatory member movable in one direction for introducing a rod of adhesive through the inlet opening into engagement with said feeding means and in the opposite direction for withdrawing the rod outwardly through said opening away from engagement with said feeding means, and means for moving said member in said directions.

6. In a handling apparatus for adhesive in rod form, said apparatus having a heated hollow casing provided with an inlet opening and an outlet opening, a rotatable disk journaled in said casing with a narrow passage along its periphery extending between said openings, and means for driving said disk to cause it to carry thermoplastic adhesive from the inlet opening to the outlet opening, a member movable in one direction for introducing a rod of adhesive through the inlet opening into contact with said disk and in the opposite direction for withdrawing the rod outwardly through said opening away from said disk, and means for moving said member in said directions.

7. In a handling apparatus for adhesive in rod form, said apparatus having a heated hollow casing provided with inlet and outlet openings, means movable within the casing for carrying thermoplastic adhesive from one opening to the other, and means for operating said carrying means, an oscillatory member movable in one direction for introducing a rod of adhesive through the inlet opening into contact with said carrying means and in the opposite direction for withdrawing the rod outwardly through said opening away from said carrying means, means for moving said member in said directions, and mechanism controlled by said introducing means for causing said operating means to operate said carrying means as the rod is introduced and to stop said carrying means as the rod is withdrawn.

8. In a handling apparatus for adhesive in rod form, said apparatus having a heated hollow casing provided with an inlet opening and an outlet opening, a rotatable disk journaled in said casing with a narrow passage along its periphery extending between said openings, and means for driving said disk to cause it to carry thermoplastic adhesive from the inlet opening to the outlet opening, a member movable in one direction for introducing a rod of adhesive through the inlet opening into contact with said disk and in the opposite direction for withdrawing the rod outwardly through said opening away from said disk, means for moving said member in said directions, and mechanism controlled by said moving means for causing said driving means to rotate the disk as the rod is introduced and to stop rotation of the disk as the rod is withdrawn.

9. In apparatus for handling a limber rod of thermoplastic adhesive, a heated hollow casing provided with inlet and outlet openings, a member rotatable within the casing to carry a rod of adhesive from one opening to the other, means movable in one direction for thrusting said rod into the inlet opening until it contacts with said carrying member, means for then releasing the rod from the movable means to the action of the carrying member, an operator-controlled device for driving said carrying member, and a connection between said operator-controlled device and said movable thrusting means operative to effect a reverse movement of the latter, thereby causing it to withdraw an unmelted portion of the rod from the inlet opening.

10. In a handling apparatus for adhesive in rod form, said apparatus having a heated hollow casing provided with inlet and outlet openings, and means movable within the casing effective for carrying thermoplastic adhesive from one opening to the other when a rod of adhesive is in engagement therewith, a member for introducing a rod of adhesive through the inlet opening into engagement with said carrying means, yieldable means for holding the member in operative contact with the rod, a cam for moving the member against the action of said yieldable means out of operative contact with the rod of adhesive during the introductory movement of the member, and means for moving said member to move the rod.

11. In a handling apparatus for adhesive in rod form, said apparatus having a heated hollow casing provided with inlet and outlet openings, and means movable within the casing effective for carrying thermoplastic adhesive from one opening to the other when a rod of adhesive is in engagement therewith, a member movable in one direction for introducing a rod of adhesive through the inlet opening into contact with said carrying means and in the opposite direction for withdrawing the rod outwardly through said opening away from said carrying means, yieldable means for holding the member in operative contact with the rod, a cam for moving the member against the action of said yieldable means out of operative contact with the rod of adhesive during the introductory movement of the member, and means for moving said member in said directions.

12. In a handling apparatus for adhesive in rod form, said apparatus having a heated hollow casing provided with inlet and outlet openings, an arcuate member pivotally movable in one direction for introducing a rod of adhesive into the heated casing and in the opposite direction for withdrawing the rod therefrom, yieldable means for holding the member against the rod, a fixed cam for moving the member against the action of said yieldable means away from the rod of adhesive during the introductory movement of the member, and means for moving said member in said directions.

13. In a handling apparatus for adhesive in rod form, said apparatus having a heated hollow casing provided with inlet and outlet openings, and means movable within the casing for carrying thermoplastic adhesive from one opening to the other, a slotted guide for leading the rod of adhesive into the inlet opening, a member projecting through a slot of the guide to engage a rod of adhesive and thrust it through the inlet opening into contact with said carrying means and to withdraw the rod outwardly through said opening away from said carrying means, yieldable means for holding the member against the rod, a cam for moving the member against the action of said yieldable means away from the rod of adhesive during the introductory movement of the member, a nozzle connected to the outlet opening, and operator-controlled means for moving said member reversely as pieces of work are presented to the nozzle.

14. In a handling apparatus for adhesive in rod form, said apparatus having a heated hollow casing provided with inlet and outlet openings, and means movable within the casing for carrying thermoplastic adhesive from one opening to the other, a member movable in one direction for thrusting a rod of adhesive through the inlet opening into contact with said carrying means and in the opposite direction for withdrawing the rod outwardly through said opening away from said carrying means, a spring for yieldingly holding said member against the rod, a cam for moving the member against the spring away from the rod of adhesive during the introductory movement of the member, a guide adapted to lead the rod into the inlet opening and ventilated for cooling the rod after withdrawal from said opening, and means for moving said member in said directions.

15. In a handling apparatus for adhesive in rod form, said apparatus having a heated hollow casing provided with inlet and outlet openings, means movable within the casing for carrying thermoplastic adhesive from one opening to the other, an arcuate member pivotally movable in one direction for introducing a rod of adhesive into the heated casing and in the opposite direction for withdrawing the rod therefrom, a spring for yieldingly holding the member against the rod, a cam for moving the member against the action of the spring out of contact with the rod during the introductory movement of the member, a ventilated guide for leading the rod of adhesive from said member into the inlet opening and for cooling said rod after withdrawal from said opening, and means for moving said member in said directions.

16. An adhesive handling apparatus comprising a heated hollow casing having inlet and outlet openings, a rotatable disk journaled in the casing with the opposite side faces of said disk fitting closely within the walls of the casing, said casing providing a passage extending from one opening to the other along the periphery of the disk, said disk being provided with grooves on its opposite side faces extending inwardly from the periphery toward the center of rotation for collecting molten adhesive which may work inwardly between the sides of the disk and the walls of the casing and for returning the collected adhesive to said passage by centrifugal action, and means for rotating the disk to carry melted adhesive from the inlet opening along said passage to the outlet opening.

17. An adhesive handling apparatus comprising a heated hollow casing having inlet and outlet openings, a rotatable disk journaled in the casing, said casing providing a passage extending from one opening to the other along the periphery of the disk, and means for rotating the disk to carry melted adhesive from the inlet opening along said passage to the outlet opening, said disk having a peripheral portion of a thickness fitting closely within the walls of said casing, and a body portion of symmetrically reduced thickness separated from said walls to reduce the power required to rotate the disk, the opposite side faces of said peripheral portion being provided with grooves extending inwardly from the periphery of the disk to said reduced body portion for collecting molten adhesive which may work inwardly between the sides of the disk and the walls of the casing, and for returning the collected adhesive to said passage by centrifugal action.

18. In a handling apparatus for adhesive in rod form, said apparatus having a heated hollow casing provided with inlet and outlet openings and means movable within the casing for carrying thermoplastic adhesive from one opening to the other, a ventilated guide member for leading a rod of adhesive into the inlet opening, and means for pivotally supporting said guide to permit it to be swung away from the heated casing.

19. In a handling apparatus for adhesive in rod form, said apparatus having a heated hollow casing provided with inlet and outlet openings, a rotatable disk journaled in the casing, said casing providing an annular passage extending from one opening to the other along the periphery of the disk, and means for rotating the disk to carry melted adhesive from the inlet opening along said passage to the outlet opening, said disk having an annular groove around its periphery to provide a greater surface area on the moving disk for carrying the adhesive along said passage against the resistance of the fixed surface area of said passage.

20. In a handling apparatus for adhesive in rod form, said apparatus having a heated hollow casing provided with inlet and outlet openings, a rotatable disk journaled in the casing, said casing providing an annular passage extending from one opening to the other along the periphery of the disk, and means for rotating the disk to carry melted adhesive from the inlet opening along said passage to the outlet opening, said disk having an arcuately concave annular groove around its periphery to provide a greater surface area on the moving disk for carrying the adhesive along said passage against the resistance of the fixed surface area of said passage.

21. In a handling apparatus for adhesive in rod form, said apparatus having a heated hollow casing provided with inlet and outlet openings, a rotatable disk journaled in said casing, and means for rotating the disk to carry melted adhesive from the inlet to the outlet opening, said disk having an annular groove in its periphery forming a passage leading from the inlet to the outlet opening, the open side of said passage being closed by a surface on said casing whereby the surface area of the moving disk carrying the adhesive is greater than the fixed surface area of said passage.

22. In a handling apparatus for adhesive in rod form, said apparatus having a heated hollow casing provided with inlet and outlet openings, a rotatable disk journaled in the casing, and means for rotating the disk to melt adhesive inserted in the inlet opening and to carry it from the inlet to the outlet opening, said disk having a substantially rectangular annular groove in its periphery forming three sides of a passage leading from the inlet to the outlet opening, the open side of said passage being closed by the inner periphery of a removable perforated plate which constitutes a portion of the casing around the disk, whereby the peripheral surface area of the moving disk carrying the adhesive is greater than the fixed surface area of the passage closed by said plate.

23. In a handling apparatus for adhesive in rod form, a heated hollow casing having a substantially circular recess, a disk rotatable within the recess, said disk having a grooved periphery, and means for closing the recess to leave an annular passage around a large portion of the periphery of the disk, said casing having an inlet opening to permit the introduction of a rod of cement into the annular passage and an outlet opening to permit the delivery of melted cement from said passage, said disk having at one side of the groove a removable circular plate which constitutes a side face of the groove.

24. In a handling apparatus for adhesive in rod form, a heated hollow casing having a substantially circular recess, a disk rotatable within the recess, said disk having a grooved periphery, and means for closing the recess to leave an annular passage around a large portion of the periphery of the disk, said casing having an inlet to permit the introduction of a rod of cement into the annular passage and an outlet to permit the delivery of melted cement from said passage, said disk having at one side of the groove a removable flange-forming plate which constitutes a side face of the groove, the outer surface of the periphery of the annular passage being formed by a removable perforated plate which constitutes a portion of the thickness of the casing around the disk.

References Cited in the file of this patent

UNITED STATES PATENTS

| | | |
|---|---|---|
| 2,347,674 | Dow et al. | May 2, 1944 |
| 2,437,263 | Manning | Mar. 9, 1948 |
| 2,544,661 | Fossa | Mar. 13, 1951 |
| 2,567,960 | Myers et al. | Sept. 18, 1951 |
| 2,659,340 | Zinn | Nov. 17, 1953 |
| 2,681,685 | Arkless | June 22, 1954 |